(12) United States Patent
Kummu et al.

(10) Patent No.: US 8,898,773 B2
(45) Date of Patent: Nov. 25, 2014

(54) APPLIANCED DOMAIN NAME SERVER

(75) Inventors: Ville Kummu, Oulu (FI); Petri Aukia, Mäntsälä (FI); Juha Holkkola, Helsinki (FI)

(73) Assignee: Nixu Software Oy, Helsinki (FI)

( * ) Notice: Subject to any disclaimer, the term of this patent is extended or adjusted under 35 U.S.C. 154(b) by 850 days.

(21) Appl. No.: 11/688,594

(22) Filed: Mar. 20, 2007

(65) Prior Publication Data
US 2008/0276313 A1    Nov. 6, 2008

(30) Foreign Application Priority Data
Mar. 20, 2006 (FI) .................................. 20065179

(51) Int. Cl.
*H04L 29/06* (2006.01)
*H04L 29/12* (2006.01)

(52) U.S. Cl.
CPC ...... *H04L 61/1511* (2013.01); *H04L 29/12066* (2013.01); *H04L 63/1408* (2013.01); *H04L 63/1441* (2013.01)
USPC .......................................................... 726/22

(58) Field of Classification Search
CPC ............... H04L 61/1511; H04L 29/12066; H04L 63/1408; H04L 63/1441
USPC .................................... 726/10, 11, 22, 23, 25
See application file for complete search history.

(56) References Cited

U.S. PATENT DOCUMENTS

| | | | | |
|---|---|---|---|---|
| 6,049,671 A * | 4/2000 | Slivka et al. | ................. | 717/173 |
| 6,256,668 B1 * | 7/2001 | Slivka et al. | ................. | 709/220 |
| 6,298,445 B1 * | 10/2001 | Shostack et al. | ................. | 726/25 |
| 7,013,343 B2 * | 3/2006 | Shigezumi | ................. | 709/232 |
| 7,171,683 B2 * | 1/2007 | Pazi et al. | ................. | 726/13 |
| 7,197,574 B1 * | 3/2007 | Ishiyama | ................. | 709/245 |
| 7,218,974 B2 * | 5/2007 | Rumi et al. | ................. | 700/28 |
| 7,313,815 B2 * | 12/2007 | Pazi et al. | ................. | 726/7 |
| 7,350,228 B2 * | 3/2008 | Peled et al. | ................. | 726/6 |
| 7,464,403 B2 * | 12/2008 | Hardman, Jr. | ................. | 726/14 |
| 7,626,940 B2 * | 12/2009 | Jain | ................. | 370/252 |
| 7,680,955 B2 * | 3/2010 | Huang et al. | ................. | 709/245 |
| 8,301,767 B1 * | 10/2012 | Davis et al. | ................. | 709/225 |

(Continued)

FOREIGN PATENT DOCUMENTS

FR    2 863 128 A1    6/2005
WO    0192997 A2     12/2001

OTHER PUBLICATIONS

Cummings, J.: "Software as Appliance," Network World, syyskuu 2005. Koko dokumentti.

(Continued)

*Primary Examiner* — Michael S McNally
(74) *Attorney, Agent, or Firm* — Barnes & Thornburg LLP

(57) ABSTRACT

A software installation package for a domain name server (DNS) comprises a hardened operating system, a domain name server software, a management interface. To detect and block attack attempts (2-1), the software installation package also comprises an attack detection logic (ADS) for analyzing (2-2, 2-3) IP packets based on a set of attack detection rules. A response logic reacts (2-4) to detected attack attempts.

9 Claims, 1 Drawing Sheet

(56) References Cited

U.S. PATENT DOCUMENTS

| | | | |
|---|---|---|---|
| 2001/0052007 A1* | 12/2001 | Shigezumi | 709/223 |
| 2002/0099955 A1* | 7/2002 | Peled et al. | 713/200 |
| 2003/0009542 A1* | 1/2003 | Kasal et al. | 709/222 |
| 2003/0084319 A1* | 5/2003 | Tarquini et al. | 713/200 |
| 2003/0110274 A1* | 6/2003 | Pazi et al. | 709/229 |
| 2004/0073634 A1* | 4/2004 | Haghpassand | 709/220 |
| 2004/0210672 A1* | 10/2004 | Pulleyn et al. | 709/245 |
| 2005/0005152 A1* | 1/2005 | Singh et al. | 713/200 |
| 2005/0086328 A1* | 4/2005 | Landram et al. | 709/220 |
| 2005/0235281 A1* | 10/2005 | Lefrancois | 717/175 |
| 2006/0143711 A1* | 6/2006 | Huang et al. | 726/23 |
| 2006/0146816 A1* | 7/2006 | Jain | 370/389 |
| 2007/0283339 A1* | 12/2007 | Hardman, Jr. | 717/168 |
| 2009/0144798 A1* | 6/2009 | Ozog | 726/1 |

OTHER PUBLICATIONS

Daniel Whyte, Evangelos Kranakis and P.C. van Oorschot. DNS-based Detection of Scanning Worms in an Enterprise Network. Conference Proceedings Article, Security Symposium. Apr. 2, 2005.

Anonymous: "Nixu SNS—Security White Paper", Oct. 1, 2006, pp. 1-8.

"Linux-Kompendium: Linux-Firewall mit IP-Tables", Feb. 12, 2006, pp. 1-18.

Hernick et al., "Do-It-Yourself DNS", Network Computing, Mar. 4, 2003, pp. 1-5.

Supplementary European Search Report dated May 15, 2013 for European Patent Application No. EP 07712625.

* cited by examiner

APPLIANCED DOMAIN NAME SERVER

BACKGROUND OF THE INVENTION

The invention relates in general to applianced Internet domain name servers (DNS), ie, DNS servers supplied as appliances. Specifically, the invention relates to techniques for improving immunity of applianced domain name servers against denial-of-service (DoS) attacks and other types of network security threats. In the following description, DoS attacks will be used as an illustrative but non-exhaustive example of network security threats addressed by the invention, but it is to be understood that the inventive technique is applicable to other types network security threats, such as port scans, DNS cache poisonings or the like.

The use of mnemonic names, as opposed to cryptic Internet Protocol (IP) addresses, is based on domain name system (or servers, DNS). The DNS service is a public, distributed, database which maps domain names to IP addresses and/or vice versa. Traditionally the DNS service has been implemented by means of a hierarchical server architecture in which one server—a primary name server—is used for actual administration of the name service, while one or more secondary name servers act as authoritative name servers for zones managed by means of the primary name server, and caching name servers perform recursive lookups to authoritative name servers in order to resolve name queries originating from clients, ie, provide name to IP address translation. Because public DNS service requires that both the authoritative and the caching name servers are open to the public network, they are vulnerable to hacking attempts and other network security threats.

At the time when this invention was made, web-based dictionary Webopedia defined a DoS attack as follows: "A type of attack on a network that is designed to bring the network to its knees by flooding it with useless traffic. Many DoS attacks, such as the Ping of Death and Teardrop attacks, exploit limitations in the TCP/IP protocols. For all known DoS attacks, there are software fixes that system administrators can install to limit the damage caused by the attacks. But, like viruses, new DoS attacks are constantly being dreamed up by hackers." As stated above, the ingenuity of hackers is not restricted to DoS attacks.

A well-known approach to making DNS servers less vulnerable to DoS attacks is increasing the throughput of individual DNS servers, eg by means of optimization, such that they are able to process the increased load. An alternative approach is increasing the number of individual DNS servers for increased redundancy. This approach has been used together with load-balancing switches such that a DNS server cluster can be substituted for an individual DNS server.

DoS attacks are not the only type of attacks which are being used against DNS servers. Another type of attack is based on viruses, worms, known vulnerabilities of the software modules used in the DNS server, and the like which attempt to infiltrate the internal software of DNS servers. An approach frequently adopted by equipment and software providers against such infiltration is called hardening of the hardware and/or software platform. The purpose of hardening is to make the platform less vulnerable to hacking.

A specific problem underlying the invention is at least partially related to the fact that the platform-hardening approach and the technique of installing software fixes tend to be mutually incompatible. The very act of hardening the DNS platform also makes it harder to install software fixes to the DNS platform.

BRIEF DESCRIPTION OF THE INVENTION

An object of the invention is to provide a DNS server such that the DNS server solves the above-identified simultaneous problems. In other words, the DNS server should have increased resistance against the above-described network security threats and vulnerabilities of the software modules, such as DoS attacks, port scans, DNS cache poisoning attempts and malicious code infiltration.

The invention is at least partially based on the realization that the idea of responding to DoS attacks by increasing the throughput and/or redundancy of DNS servers is a dead end. Instead, the DNS server should be provided with an appropriate attack detection logic and an attack response logic which proactively detect attack attempts and respond to detected attack attempts by appropriate measures. The attack detection logic and an attack response logic are preferably local within the DNS server. By running a local intrusion prevention systems on a public DNS server with the attack detection and attack response logic, the attacked public DNS server will be able to drop all name queries from origin of the attack (technically stated: from the IP address of the attacking device, as detected by the attack detection logic). The attack response logic can also cease to react to other traffic originating from the attacking device for a predefined period of time. This technique effectively creates an illusion of a successful attack by imitating a non-responsive and/or crashed public DNS server.

The invention is also partially based on the realization that the platform-hardening approach and the technique of installing software fixes are mutually incompatible, because hardening the DNS platform makes it harder to install software fixes manually to the DNS platform. Accordingly, the invention is partially based on the realization that a DNS server software, which includes the inventive attack detection logic and an attack response logic, should be provided in an applianced form so as to automate the time-consuming and complicated tasks and processes associated with manual updating and hardening of the DNS server.

As used herein, the term "applianced", when used in the context of software products, is generally defined in reference 1 (Cummings). Reference 1 describes an applianced software product in a manner which can be summarized as follows: "Like ASP (=application service provider) software, a software appliance is modular, Web-based and available on a leased or pay-as-you-go basis. The self-contained software modules include the core application logic running on top of an open source software stack-operating system, Web server and so forth. They have their own application-specific database and data management tools, and use the standard XML Web services API for all data import and export. Customers simply plop the software appliance on to a bare metal server and it runs. Just like a typical hardware appliance, no care and feeding is required by database administrators or operations personnel. Companies . . . provide software designed to run on a user-provided server but with the simplicity and functionality of a typical hardware appliance. Simply placing [an] application logic on a LAMP [=Linux, Apache, MySQL, Perl] stack is not sufficient because the customer still needs to deal with the Linux operating system and the management and support of all that."

An applianced domain name server can be supplied as a software installation package which includes all the DNS and server software. Alternatively, the applianced domain name server can be supplied as a hardware-software combination which includes the software installation package according to the invention as well as a required hardware platform.

An aspect of the invention is a method according to claim 1. Another aspect of the invention is a software installation package according to claim 2. The software installation package according to the invention comprises:

a hardened operating system;
a domain name server software which has been securely pre-configured;
a management interface;
a local attack detection logic for detecting an attack attempt, wherein the attack detection logic comprises means for analyzing a plurality of IP packets based on a predetermined set of attack detection rules;
a local response logic for responding to a detected attack attempt; and
preferably, an automated process for updating software used in the software installation package after the installation and hardening.

In one embodiment the attack detection logic comprises means for monitoring a frequency of inquiries (name queries) from each of a plurality of client computers. As used herein, the frequency of inquiries may be determined by keeping track of the number of inquiries from each client computer per unit of time. An attack attempt may be detected if the number of inquiries from any client computer per unit of time exceeds a predetermined threshold. Alternatively or additionally, an attack attempt may be detected if the size of inquiries exceeds a typical inquiry size by significant predetermined margin.

Specific implementations of the attack detection logic comprise means, such as logic routines and associated processing hardware (processor, memory, etc.), for directing the DNS server processor to apply one or more of the following rules to incoming DNS traffic:

Detection of DNS zone transfer in TCP/UDP protocol. For example, the detection logic may detect the occurrence of a large amount of IP traffic directed to port 53. Instead or in addition, an alert may be triggered in response to a packet whose contents is "|00 00 FC|".

Detection of a DNS named authors/version query attempt. For example, an alert may be triggered in response to a packet whose contents is "|07|authors", "|07|version" or "|04|bind|00|".

Detection of a DNS SPOOF query response PTR with a TTL (time to live) field set to one minute and an empty authority field;

Detection of packet whose contents is "|85 80 00 01 00 01 00 00 00 00|" or "|C0 0C 00 0C 00 01 00 00 00|<|00 0F|";

Detection of a DNS EXPLOIT named 8.2 to 8.2.1, with a packet contents of "../../../";

Detection of a DNS EXPLOIT named tsig overflow attempt, with a packet contents of "|AB CD 09 80 00 00 00 01 00 00 00 00 00 00 01 00 01|";

Detection of a DNS EXPLOIT named "overflow ADM-ROCKS", with a packet contents of "ADMROCKS", see eg http://www.cert.org/advisories/CA-1999-14.html;

Detection of a DNS EXPLOIT named "overflow attempt", with a packet contents of "|CD 80 E8 D7 FF FF FF|/bin/sh", see eg http://www.cert.org/advisories/CA-1998-05.html;

Detection of a DNS EXPLOIT x86 named "Linux overflow attempt", with a packet contents of "1|C0 B0|?1|DB B3 FF|1|C9 CD 8 0|1|C0|"; and/or Detection of a DNS TCP inverse query with a byte_test: 1,<,16,2 or byte_test:1,&,8,2.

Instead of the above-described techniques, or in addition to them, the attack detection logic may comprise means, such as logic routines, input-output circuitry and associated processing hardware, for monitoring www traffic to the server, wherein potential attacks may be detected by applying one or more of the following rules:

1. general www attacks:
   a. WEB ATTACKS command attempt, with one or more of the following as packet contents:
      "/bin/ps", "ps%20", "wget%20", "uname%20-a";
      "/usr/bin/id", "|3B|id", "/bin/echo", "/bin/kill";
      "/bin/chmod", "/chgrp", "/chown", "/usr/bin/chsh";
      "tftp%20", "/usr/bin/gcc", "gcc%20-o", "/usr/bin/cc";
      "bin/python", "/usr/bin/perl", "traceroute%20";
      "/bin/ping", "nmap%20", "rm%20", "/bin/mail"; and/or
      "/etc/shadow".
   b. EB-MISC perl post attempt, with one or more of the following as packet contents:
      "POST", "/perl/".

2. PHP-specific www attacks:
   a. WEB-PHP bb_smilies.php access, with a packet contents of "/bb_smilies.php";
   b. WEB-PHP content-disposition, with a packet contents of "Content-Disposition |3A|" or "form-data|3B|";
   c. WEB-PHP DNSTools administrator authentication bypass attempt, with a packet contents of:
      "/dnstools.php";
      "user_logged_in=true"; or
      "user_dnstools_administrator=true";
   d. WEB-PHP Blahz-DNS dostuff.php modify user attempt, with a packet "dostuff.php?action=modify_user";
   e. WEB-PHP directory.php arbitrary command attempt, with a packet "/directory.php", "dir=", "|3B|";
   f. WEB-PHP remote include path, with a packet whose contents comprises one or more of the following:
      ".php";
      "path="; or
      pcre:"/path=(http|https|ftp)/i";
   g. WEB-PHP admin.php file upload attempt, with a packet whose contents comprises one or more of the following:
      "/admin.php"; or
      "file_name=";
   h. WEB-PHP PHP-Nuke remote file include attempt, with a packet indicating URL: "/index.php" and with a contents of "file=";
   i. WEB-PHP strings overflow, with a packet contents of:
      "|BA|1|FE FF FF F7 D2 B9 BF FF FF FF F7 D1|"; or
      "?STRENGUR";
   j. WEB-PHP PHPLIB remote command attempt, with a packet contents of "_PHPLIB[libdir]" or "/db_mysql.inc".

In addition, the attack detection logic may also comprise means, such as logic routines and associated processing hardware, for monitoring and blocking inbound port scans. Those skilled in the art will realize that the above-described set of rules is provided by way of example only, and new attack attempts will require updating the set of rules.

The response logic may activate one or more of several predetermined responses if it detects an attack attempt. In one embodiment the response logic comprises means for ignoring inquiries from the attacking client computer. For example, an identifier, such as an IP address, of the attacking client computer can be put on a black list which indicates client computers whose inquiries will not be processed, at least until the entry on the black list has expired. Entries on the black list may have time stamps or expiry dates, whereby expired entries on the black list can be cleared periodically.

Alternatively, or additionally, the response logic may comprise means for isolating the DNS server from the attacking client computer. For example, a traffic analyzer may configure a firewall to block inquiries from the attacking client computer. In a specific implementation, the firewall protecting the DNS server may be configured initially to direct all incoming packets to the attack detection logic. The attack detection logic in turn checks each incoming packet based on some or all of the rules described above. If an incoming packet triggers an alert based on one of the detection rules, the attack detection logic may add a new rule to the firewall, the new rule barring packets having the same IP address from which the alert-triggering packet was sent. The firewall passes normal packets, ie, packets which do not cause alerts by triggering any of the detection rules, to their destinations without taking any actions. A benefit of this implementation is that attacks from the affected IP address fail to penetrate any further than the firewall and do not cause undue load to the DNS server. A maintenance person or logic may, if so desired, scan the rules applied and delete rules deemed unnecessary.

In yet another embodiment the response logic may comprise means for temporarily suspending the entire functionality of the domain name server. Yet further, the response logic may send a notification to maintenance personnel. However, since DNS servers tend to be under some kind of attack constantly, it is beneficial to process normal-scale attacks automatically in the DNS and only alarm the maintenance personnel if the response logic is unable to cope with the attack on its own.

BRIEF DESCRIPTION OF THE DRAWINGS

In the following the invention will be described in greater detail by means of specific embodiments with reference to the attached drawings, in which.

DETAILED DESCRIPTION OF SPECIFIC EMBODIMENTS

Figure 1:
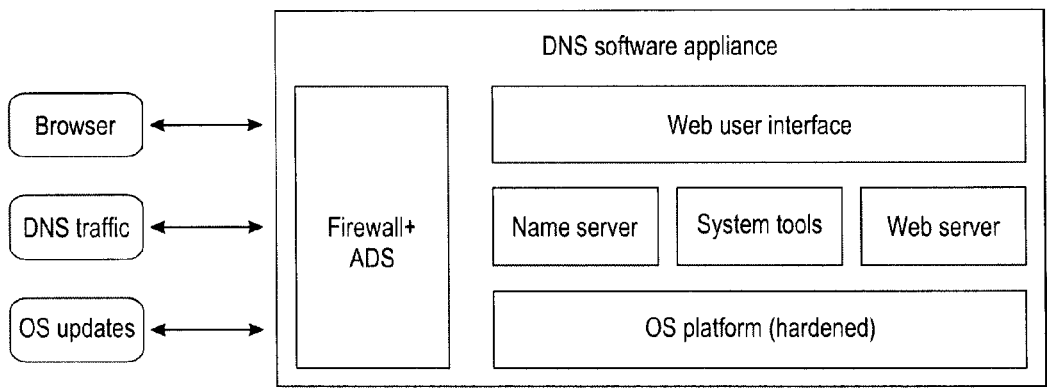
FIG. 1 shows the various layers of a DNS software appliance.

FIG. 1 shows the various layers of a DNS software appliance. Most of the layers and components are known to a skilled reader. In a typical implementation, the invention causes changes in the firewall section which comprises or is closely coupled to the attack detection system ADS according to the invention.

Figure 2:
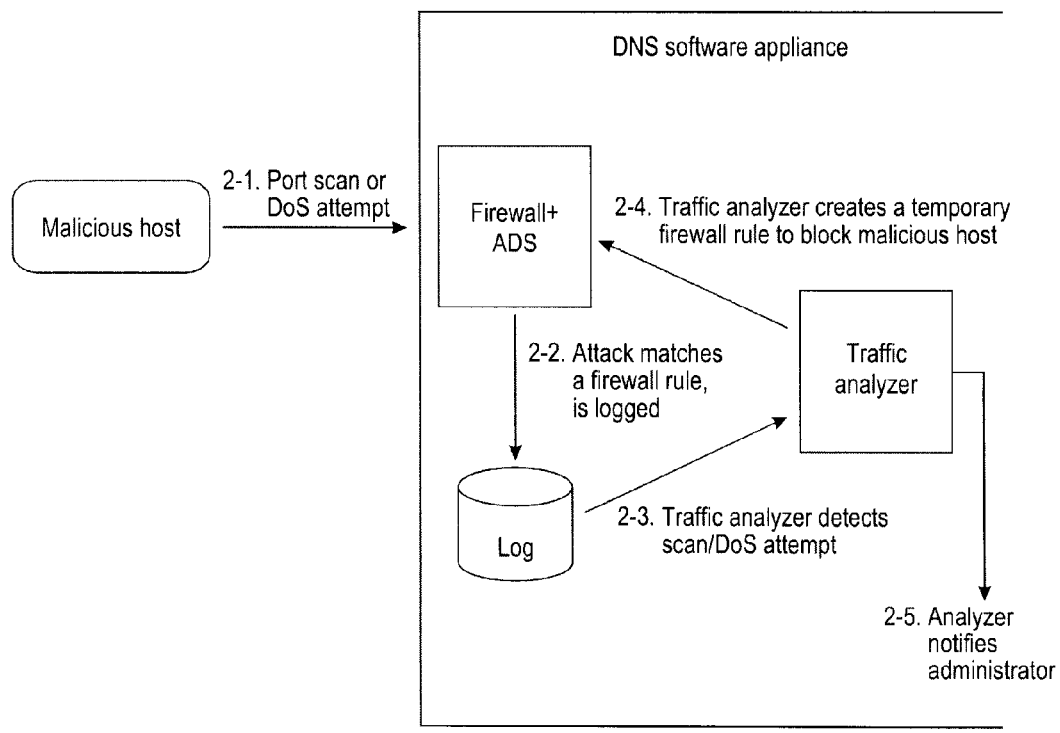
FIG. 2 illustrates the operation of the attack detection logic and attack response logic.

FIG. 2 illustrates the operation of the attack detection logic and attack response logic. In step 2-1, the attack detection system ADS detects an attack attempt, such as a port scan or DoS attempt, by a malicious host. In step 2-2, the attack detection system ADS determines that the attack attempt matches one or more of the predetermined attack detection rules. As a result, the attack attempt and the malicious host are logged. In step 2-3, a traffic analyzer, which is part of the attack detection system ADS or closely coupled to it, detects the port scan or DoS attempt. In step 2-4, the traffic analyzer creates a temporary firewall rule which blocks traffic from the malicious host. In an optional step 2-5, the attack detection system ADS may notify administration personnel.

It is apparent from the above description and the attached drawings that the specific embodiments of the present invention provide certain advantages over prior art DNS implementations. A DNS software installation package which comprises an automated process for updating software used in the software installation package after installation and hardening provides an improved technique for installing software upgrades. In known DNS servers, in which the regular updating of software of the DNS servers is performed manually, such updating and its associated processes are time-consuming and require special skills from administrative personnel. The automated software updating process reduces the expenses incurred by installing software upgrades. Further cost-related benefits are caused by the fact the invention provides more sophisticated response techniques compared with the prior art approach in which generous over-capacity of the DNS server is the principal mode of defence against DoS attacks and similar threats. The local nature of the attack detection logic and attack response logic also address a specific problem of known DNS servers. Known intrusion detection and intrusion prevention systems have been designed to be used centrally to protect a given network in its entirety by detecting attacks and configuring a centralized firewall. Connecting public DNS servers to such centralized systems has been difficult or dangerous because such an approach would indirectly provide a public access to the firewall and firewall rules of a given network.

It is readily apparent to a person skilled in the art that, as the technology advances, the inventive concept can be implemented in various ways. The invention and its embodiments are not limited to the examples described above but may vary within the scope of the claims.

REFERENCES

1. Cummings, Joanne: Software as appliance, Network World, 26 Sep. 2005.

The invention claimed is:

1. A method for making an applianced domain name server, the method comprising:
    forming a software installation package for the domain name server; and
    making the appplianced domain name server by installing the software installation package in a server, wherein the software installation package comprises:
        a hardened operating system;
        a securely pre-configured domain name server software;
        a management interface;
        a local response logic for responding to attack attempts from one or more blacklisted client computers;
        a local attack detection logic, wherein the attack detection logic performs one or more analyses, each of which being based on a plurality of IP packets from an individual client computer, based on a predetermined set of attack detection rules,
    wherein, if at least some of the analyses, which are based on the plurality of IP packets from the individual client computer, identify the individual client computer as an attacking client computer, the local attack detection logic blacklists the individual client computer as an attacking client computer thereby indicating that IP traffic from the individual client computer should be blocked.

2. The method of claim 1, wherein Domain Name Service is the only service provided to client computers by the applianced domain name server.

3. A software installation package for a domain name server, the software installation package comprising:
    a hardened operating system;
    a securely pre-configured domain name server software;
    a management interface;
    a local attack detection logic, wherein the attack detection logic performs one or more analyses, each of which being based on a plurality of IP packets from an individual client computer, based on a predetermined set of attack detection rules, wherein, if at least some of the analyses, which are based on the plurality of IP packets from the individual client computer, identify the individual client computer as an attacking client computer, the local attack detection logic blacklists the individual client computer as an attacking client computer thereby indicating that IP traffic from the individual client computer should be blocked, and wherein the software installation package is stored in a tangible software carrier that constitutes a non-transitory storage medium.

4. The software installation package of claim 3, wherein the attack detection logic comprises means for monitoring a frequency of inquiries from each of a plurality of client computers.

5. The software installation package of claim 4, wherein the set of attack detection rules comprises a rule for detecting an attack attempt from a client computer if the monitored frequency of inquiries from that client computer exceeds a predetermined limit.

6. The software installation package of claim 3, wherein the set of attack detection rules comprises a rule for detecting an attack attempt from a client computer if a monitored size of inquiries from that client computer exceeds a predetermined limit.

7. The software installation package of claim 3, wherein the response logic comprises means for temporarily suspending the functionality of the domain name server.

8. The software installation package of claim 3, further comprising an automated process for updating software used in the software installation package after installation and hardening.

9. The software installation package of claim 3, wherein Domain Name Service is the only service provided to client computers by the applianced domain name server.

* * * * *